United States Patent
Natroshvili et al.

(10) Patent No.: US 10,724,854 B2
(45) Date of Patent: Jul. 28, 2020

(54) OCCUPANCY GRID OBJECT DETERMINING DEVICES

(71) Applicant: Intel IP Corporation, Santa Clara, CA (US)

(72) Inventors: Koba Natroshvili, Waldbronn (DE); Kay-Ulrich Scholl, Malsch (DE)

(73) Assignee: Intel IP Corporation, Santa Clara, CA (US)

( * ) Notice: Subject to any disclaimer, the term of this patent is extended or adjusted under 35 U.S.C. 154(b) by 20 days.

(21) Appl. No.: 15/854,866

(22) Filed: Dec. 27, 2017

(65) Prior Publication Data

US 2019/0049239 A1 Feb. 14, 2019

(51) Int. Cl.
*G01B 11/25* (2006.01)
*G06K 9/00* (2006.01)
*G01N 15/10* (2006.01)

(52) U.S. Cl.
CPC ......... *G01B 11/2513* (2013.01); *G01N 15/10* (2013.01); *G06K 9/00201* (2013.01); *G06K 9/00805* (2013.01); *G06K 9/00838* (2013.01); *G01N 2015/1075* (2013.01)

(58) Field of Classification Search
CPC ................................................ G01B 11/2513
See application file for complete search history.

(56) References Cited

U.S. PATENT DOCUMENTS

| 8,830,403 B1* | 9/2014 | Kametani | H04N 7/013 348/441 |
| 2012/0239191 A1* | 9/2012 | Versteeg | G06N 3/004 700/246 |
| 2018/0074200 A1* | 3/2018 | Liu | G01S 17/58 |
| 2018/0203445 A1* | 7/2018 | Micks | G06F 17/5095 |

OTHER PUBLICATIONS

Danescu et al., "Modeling and tracking the driving environment with a particle-based occupancy grid," IEEE Trans. Intell. Transp. Syst., Dec. 2011., pp. 1331-1342, vol. 12, No. 4.
Tanzmeister et al., "Evidential grid-based tracking and mapping," IEEE Trans. Intell. Transp. Syst., Jun. 2017, pp. 1-14, vol. 18, No. 6.
Nuss et al., "Fusion of laser and radar sensor data with a sequential monte carlo bayesian occupancy filter," in Proc. IEEE Intelligent Vehicles Symposium (IV), Jun. 28-Jul. 1, 2015, pp. 1074-1081., Seoul, Korea.

(Continued)

*Primary Examiner* — Jefferey F Harold
*Assistant Examiner* — Justin B Sanders
(74) *Attorney, Agent, or Firm* — Viering, Jentschura & Partner MBB

(57) ABSTRACT

An occupancy grid object determining device is provided, which may include a grid generator configured to generate an occupancy grid of a predetermined region, the occupancy grid including a plurality of grid cells and at least some of the grid cells having been assigned an information about the occupancy of the region represented by the respective grid cell, a determiner configured to determine at least one object in the occupancy grid wherein the at least one object includes a plurality of grid cells, and a remover configured to remove occupancy information from at least one grid cell of the plurality of grid cells of the determined object.

18 Claims, 7 Drawing Sheets

(56) References Cited

OTHER PUBLICATIONS

Julier et al., "A new extension of the Kalman filter to nonlinear systems", Int. Symp. Aerospace/Defense Sensing, Simul. and Controls. Signal Processing, Sensor Fusion, and Target Recognition VI. 3: 182. Bibcode:1997SPIE.3068..182J. doi:10.1117/12.280797. Retrieved May 3, 2008.
Steyer et al., "Object Tracking Based on Evidential Dynamic Occupancy Grids in Urban Environments", 2017 IEEE Intelligent Vehicles Symposium (IV), Jun. 11-14, 2017, pp. 1064-1070, Redondo Beach, CA, USA.

\* cited by examiner

OCCUPANCY GRID OBJECT DETERMINING DEVICES

TECHNICAL FIELD

Various aspects of this disclosure relate generally to an object tracking device within an area occupancy determining device.

BACKGROUND

Perception is an important component of Automatic Driving (AD) as well as for many real life applications and devices which need real time information about the occupation of a given space. Through perception, devices gain crucial information about empty spaces, occupied spaces and information about changes of the environment around the them. However, since the environment around devices may be very dynamic, it is essential for the perception process to be as fast and accurate as possible.

Occupancy Grids are a perception technology that proved to be effective at combining sensors information to identify static and dynamic obstacles as well as free spaces in a given area simultaneously. They are based on so-called particles that identify the likelihood that a given area in the occupancy grid is occupied. In general, an increase of the number of particles in occupancy grids results in an increase of the perception precision; on the other hand, an increase of particles also results in an increase in computation requirements and ultimately in a reduction of perception speed.

SUMMARY

An occupancy grid object determining device is provided, which may include a grid generator configured to generate an occupancy grid of a predetermined region, the occupancy grid including a plurality of grid cells and at least some of the grid cells having been assigned an information about the occupancy of the region represented by the respective grid cell, a determiner configured to determine at least one object in the occupancy grid wherein the at least one object includes a plurality of grid cells, and a remover configured to remove occupancy information from at least one grid cell of the plurality of grid cells of the determined object.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

Figure 1:
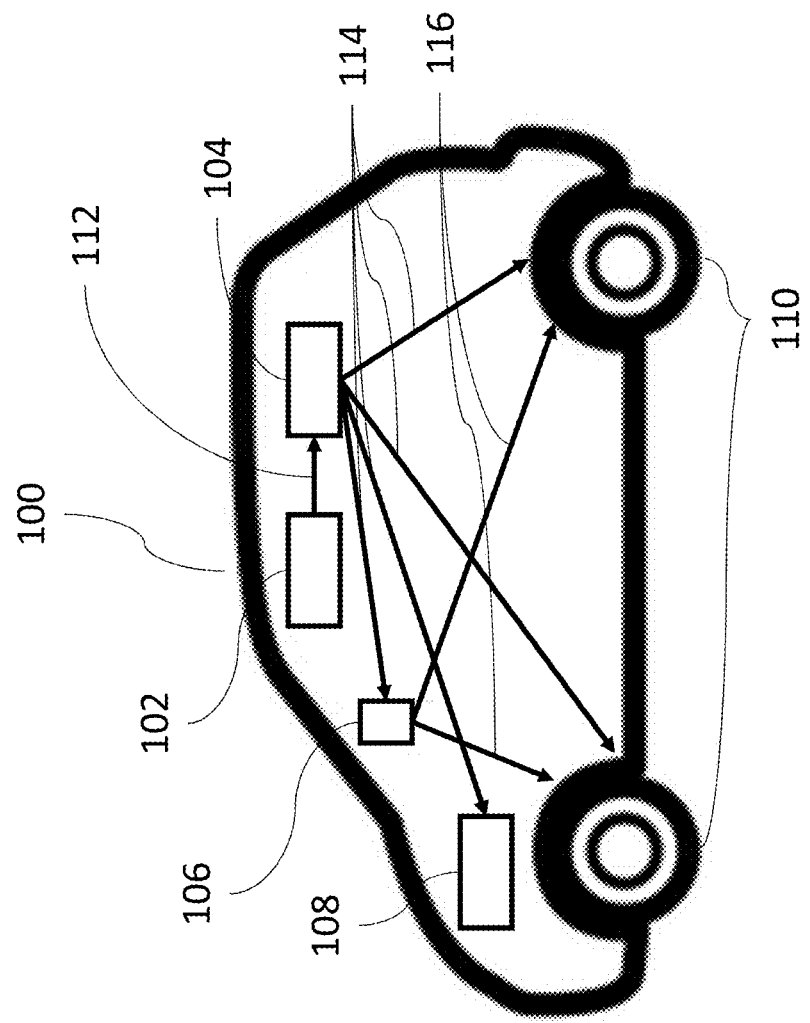
FIG. 1 shows an automatic driving vehicle including an area occupancy determining device, a controller of the automatic driving vehicle and automotive components such as a steering module, a motor, and wheels which may also include a braking system and a turning system.

The following detailed description refers to the accompanying drawings that show, by way of illustration, specific details and embodiments in which the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The following detailed description refers to the accompanying figures that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Perception is an important component of Automatic Driving (AD) as well as for many real life applications and devices which need real time information about the occupation of a given space. Through perception, devices gain crucial information about empty spaces, occupied spaces and information on changes of the environment around the them. However, since the environment around devices may be very dynamic it is desired for the perception process to be as fast and accurate as possible.

In a conventional approach, objects were detected and tracked using the so-called bounding box approach. This approach, for example, cannot be used when the object is large, for example, for the long building along the street. In this case, the bounding box cannot be put on a too large object. To solve this problem, static dynamic occupation grids were proposed. Occupation grids by fusing of the object box tracking and the static occupancy grids may provide relatively good results on the position of objects in the environment. But static occupancy grid maps are designed for the static objects and with the moving objects they have inherent errors.

Dynamic Occupancy Grids (DOG) overcome the problems of the static occupancy grids, and they are able to detect static, dynamic and free spaces simultaneously through the exploitation of particle filters.

But an increase of particles in the Dynamic Occupancy Grids and, in Occupancy Grids in general, results in an increase of the computation requirements and ultimately in a reduction of perception speed. The issue becomes particularly severe in an environment in which there are objects moving with high velocity, for example in an highway, because the high velocity results in a high distribution of the particles to match the object speed.

One solution proposed in this disclosure illustratively is to remove particles that are somewhat redundant because the information that they contribute to the Occupancy Grid can be obtained in other ways.

Whereas the description and the figures refer to an Automatic Driving (AD) example, it should be understood that the object tracking device disclosed as well as the examples disclosed in general may be used in a wide range of applications including security cameras that may use object tracking device to monitor access to a given area, traffic lights that that may use object tracking device to monitor the traffic waiting at an intersection, smart digital signage for both advertisement and information purposes that may use object tracking device to monitor estimate the number of impressions or to derive the most relevant content to display, traffic congestion sensors that may use the object tracking device to estimate the traffic in a given area, speedometers that may use the object tracking device to compute the speed of vehicles in a given area.

FIG. 1 shows an exemplary automatic vehicle (e.g. an autonomous vehicle) 100 including an area occupancy determining device 102 (which may include an object tracking device), a controller 104 of the automatic driving vehicle 100, which may be configured to control the automatic vehicle driving direction and speed, and various automotive components such as a steering module 106, a motor 108, and wheels 110 which may also include a braking system and a turning system. It should be noted that the automatic driving vehicle 100 may include various other components which are not described in detail. Furthermore, the automatic vehicle 100 may be an automatic driving car, an automatic drone, an automatic plane or other flying object, an automatic bike, trike, or the like. As an alternative, the automatic vehicle 100 may be any kind of robot or moveable hardware agent. Furthermore, it is to be noted that the vehicle 100 does not necessarily need to be an automatic vehicle, but can also be a partially automatic vehicle or a vehicle in which implements occupancy grid processes as user assistance systems. Furthermore, the disclosure below may be relevant for any device requiring a map of a given area, such as surveillance devices which may monitor a specific location. As opposed to vehicles that constantly change position, such devices may be fixed in a specific position.

The exemplary area occupancy determining device 102 may be configured to perceive the environment to determine the area(s) that may be occupied by at least one object, such as an obstacle on the road or a vehicle, and area(s) that may be free of any object. In turn, the object tracking device may identify the shape of the objects on the road and, if the objects move, their velocity and acceleration, and predict their positions and, in turn, which cells are free and which ones are occupied.

FIG. 1 also shows an exemplary connection scheme across the different components. Such communication connections realizing the connection scheme may be implemented as a wired connection or a wireless connection. Any kind of communication protocol may be used for a communication between two respective components. Furthermore, the interaction between the components may be implemented as a remote function call or an API call across software modules.

The connection 112 between the area occupancy determining device 102 and the controller 104 may be configured to provide an exemplary information flow by means of which the area occupancy determining device 102 provides e.g. the position of free and occupied spaces close to the automatic vehicle (e.g. autonomous vehicle) 100 to the controller 104. Information about occupied spaces may include the position of other vehicles and how their position may change in the (near and/or remote) future.

Each one of the connections 114 couple the controller 104 with the other components, such as the steering module 106, the motor 108, and the wheels 110, and the like. The connections 114 may be configured to provide information flow from the various automotive components: e.g. the steering module 106, the motor 108, and the wheels 110 to the controller 104.

The steering module 106 may communicate to a turning system (not shown) of the wheels 110 to change a respective wheel angle with respect to the direction of the automatic vehicle 100 forcing the automatic vehicle 100 to change direction. In an implementation of the automatic driving vehicle 100, the steering module 106 may be configured to mechanically change the angle of a respective wheel 110 with respect to the direction of the automatic vehicle 100 forcing the automatic vehicle 100 to change direction. Alternatively, the steering module 106 may be a component of a wheel's control system (not shown).

Figure 2:
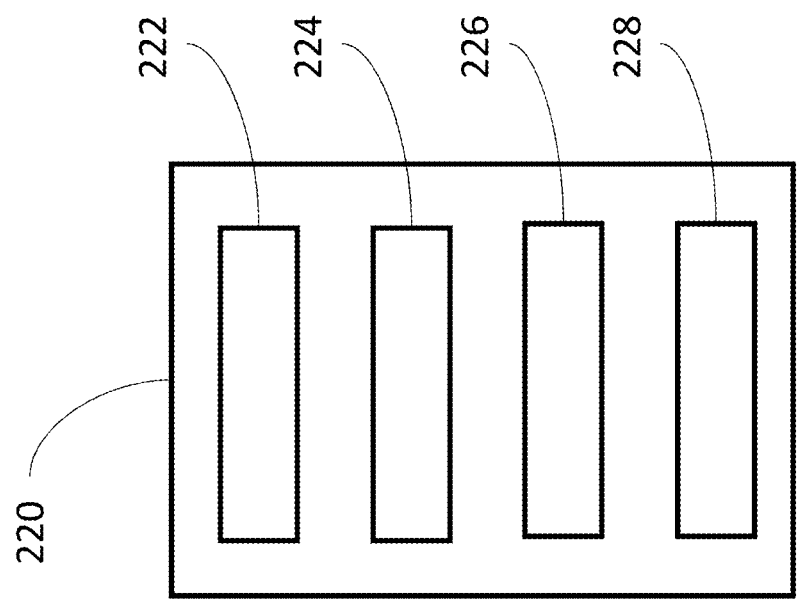
FIG. 2 shows details of the area occupancy determining device.
Figure 2:
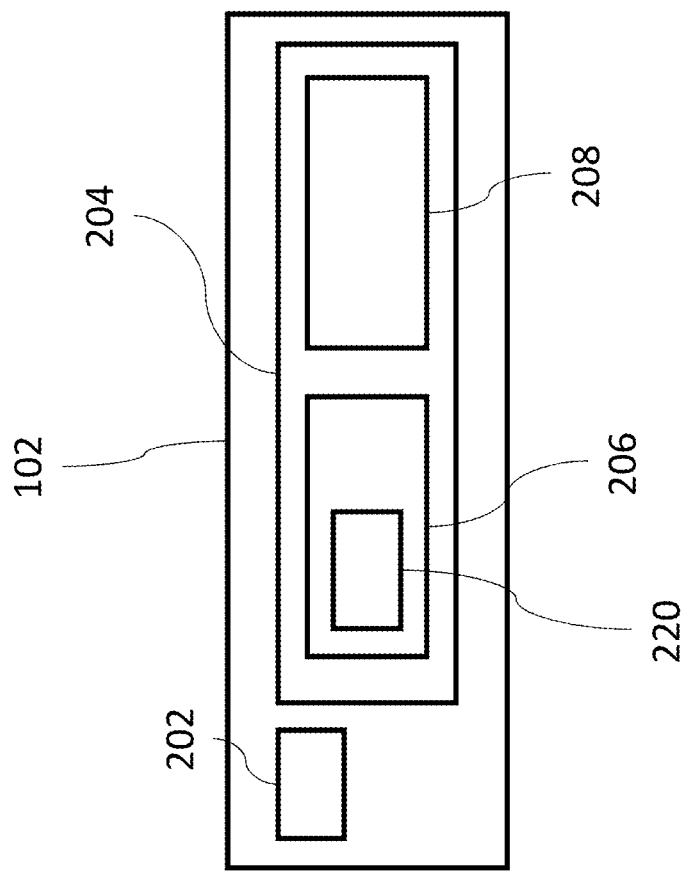

FIG. 2 shows an exemplary area occupancy determining device 102 in more detail. The area occupancy determining device 102 may include one or a plurality of sensors 202 and one or more computing devices 204 to process the information provided by the one or more sensors 202 to generate an occupancy grid of a predetermined region.

The plurality of sensors 202 are designed to detect information about the predetermined region used to generate the occupancy grid. The plurality of sensors 202 may include at least one of the following sensors 202: a camera (e.g. a stereo camera and/or an infrared camera or the like), a radar sensor, or a lidar sensor.

Each one of the computing devices 204 may in include a processor 206 and a memory 208 to store the generated occupancy grid(s).

The processor 206 may be configured to compute the object tracking device 220 which generates the occupancy grid of the predetermined region and dynamically update the occupancy grid adding occupancy information about the objects that are detected in the environment, thereby successively generating a plurality of updated occupancy grids (thus, the occupancy grid may also be referred to as dynamic occupancy grid (DOG)).

The memory 208 may be configured to store the generated occupancy grids.

The object tracking device 220 may include a grid generator 222 that generates an occupancy grid of a predetermined region; an object determiner 224 determining at least one object in the occupancy grid wherein the at least one object includes a plurality of grid cells, an occupancy remover 226 which is used to remove redundant occupancy information from at least one grid cell of the plurality of grid cells of the determined object, a movement determiner 228 configured to determine a movement of the at least one object, where the movement is determined as a common movement of the cells occupancy of at least one object over a plurality of grid cells.

The grid generator 222 generates an occupancy grid of a predetermined region. Such region may be predetermined in a number of different ways. It may be a fixed region, for example when the object tracking device is used in fixed devices such as a security camera that monitors a given area. Alternatively, the region may be predetermined functionally, for example the predetermined region may be 50 meters around a moving object; or it may be predetermined to meet some specific requirements: By way of example, at slow speeds, the region monitored may be a circle around a vehicle, at faster speeds it may extend in the forward direction becoming an oval monitoring a large area ahead of the vehicle, and a smaller area behind the vehicle.

The occupancy grid generated by the grid generator 222 may include a plurality of grid cells where at least some of the grid cells have been assigned information about the occupancy of the region represented by the respective grid cell. Examples of occupancy grids are shown in FIG. 3 and FIG. 4 and will be described in more detail below.

The occupancy remover 226, which removes redundant occupancy information from at least one grid cell of the plurality of grid cells of an occupancy grid, may be seen as an optimization component that removes redundant occupancy information that may otherwise waste computation resources.

The person skilled in the art may recognize that the object tracking device 220 and its components: the grid generator 222, the object determiner 224, the occupancy remover 226, and the movement determiner 228 are functional abstractions that in an exemplary implementation may not correspond to separate modules or to separate functions, rather they may be merged or realized as combinations of functions. By way of examples, they may be implemented by one or a plurality of processors and/or one or a plurality of controllers. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Figure 3:
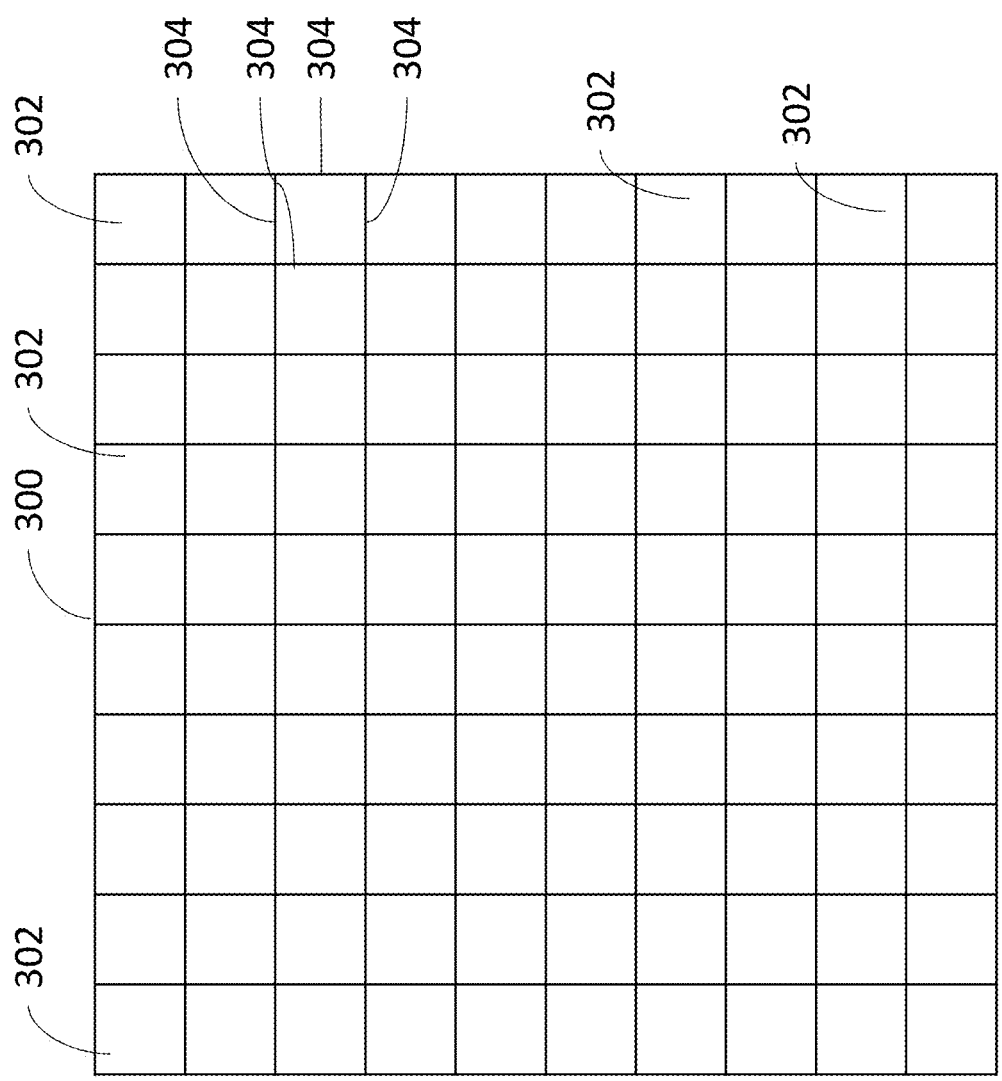
FIG. 3 shows an occupancy grid.
Figure 4:
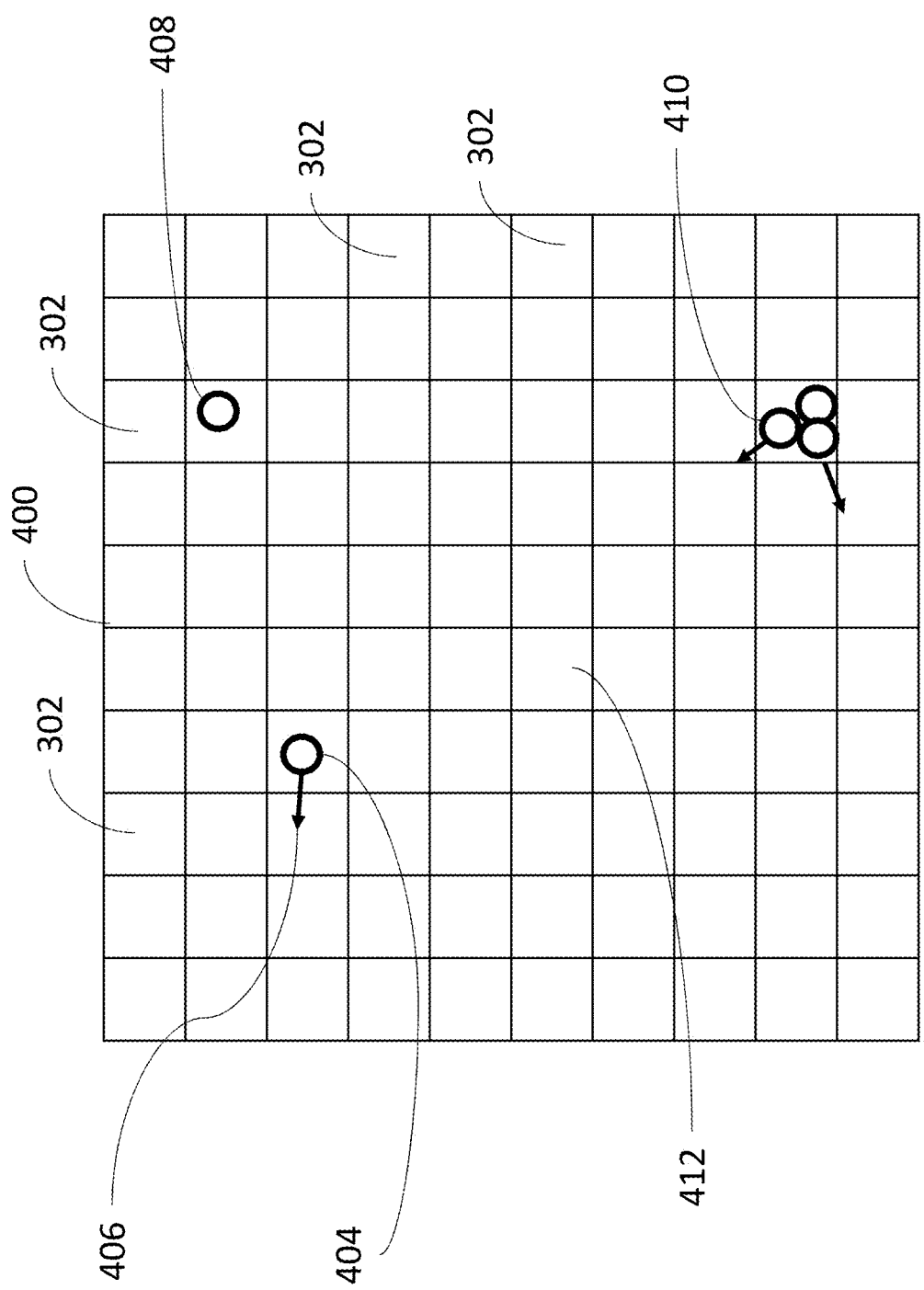
FIG. 4 shows particles in an occupancy grid.

FIG. 3 shows an exemplary occupancy grid 300. The occupancy grid includes a plurality of grid cells 302. Each grid cell 302 is framed by respective grid cell frame lines 304, and at least some of the grid cells 302 have been assigned an information about the occupancy of the region represented by the respective grid cell 302.

The grid cells 302 of the occupancy grid 300 may have substantially the same size and rectangular shape. The grid cell size may be in the range from about 5 cm by 5 cm to about 1 m by 1 m, e.g. in the range from about 10 cm by 10 cm to about 50 cm by 50 cm. It is to be noted that the grid cells 302 do not need to be of the same size or shape. By way of example, the grid cells 302 do not need to be rectangular but in general may have any desired shape.

The grid cell sizes given above are exemplary for AD applications, but it should be understood that such size may change with the specific application. Applications needing higher resolution will use smaller cells sizes, applications requiring smaller resolution may use larger cells sizes.

Although the occupancy grid 300 and its cells 302 and borders 304 are shown in FIG. 3 for illustration purposes, it should be understood that occupancy grids are never drawn, rather they are data structures stored in a memory 208 and processed and modified by a processor 206.

The occupancy grid 300 may be used by the vehicle to map sensors readings to a model of the environment of the vehicle. As exemplarily displayed in FIG. 4, sensor readings, upon processing, are placed in the occupancy grid cells as particles providing indications of cells occupancy. In turn, cells occupancy may be used by the occupancy determining device to identify objects in the environment as well as free spaces available to the vehicle.

FIG. 4 shows exemplary particles in an occupancy grid 400. Particles may initially be generated through sensor measurements. Particles may be characterized by a position, a direction, and a velocity. Particles that are associated to a position may be placed within the grid cells 302 which cover that respective position. Predictions may be made on a particle's future position in an occupancy grid 300. Particles illustratively represent a hypothesis that a respective grid cell 300 of an occupancy grid 400 is occupied by one or a plurality of object. A belief mass can be associated with particles. A belief mass may indicate the likelihood that the particle is in a given grid cell 302. Alternatively, the belief mass associated with a particle may indicate a likelihood that the particle moves at a given speed.

In FIG. 4, a first circle 404 represents a particle in the occupancy grid 400. Furthermore, an arrow 406 attached to the first particle 404 represents its direction and its velocity through the length of the arrow 406. Particles with non-zero velocity may be referred to as dynamic particles.

A second circle 408 represents a particle with zero velocity. Particles with zero velocity may also be referred to as static particles As shown in FIG. 4, a plurality of particles may be contained in a grid cell (such as e.g. grid cell 410).

The degree of occupancy of a grid cell 302 is characterized by a number of particles detected in the respective grid cell 302. The higher the number of particles in a grid cell 302, the stronger is the hypothesis that the grid cell 302 is occupied by an object, e.g. an obstacle.

Furthermore, the grid cells 302 may be associated with a velocity. The velocity of a grid cell 302 can be computed by a mathematical combination of the velocity of the particles in the respective grid cell 302.

An exemplary method for computing the mathematical combination of the velocity of the particles in a respective grid cell 302 may be the mean velocity of the particles that are contained in the respective grid cell 302.

Cell 412 in FIG. 4 does not have any particles associated with it. This cell can be assumed to be empty, indicating free space that the vehicle may occupy without risk of collision with other vehicles or objects on the road.

The grid cells 302 may be associated with belief masses about their occupancy and about the speed of their particles.

An exemplary method for associating belief masses to a grid cell 302 may be the mean of the belief masses of the particles that are located in the respective grid cell 302.

An exemplary method to associate belief masses to a cell is to compute a vector $M_c$ such that:

$$M_c = (m(\{S\}), m(\{D\}), m(\{S,D\}), m(\{F\}, v)) \quad (1)$$

Where:
c is an indication of a cell;
S is the set of static particles in the cell c;
D is the set of dynamic particles in the cell;
F is an indication of free space;
v is an indication of velocity;
m is a function that takes as input sets of points and outputs belief masses. In some examples m may be based on the Dempster-Shafer theory of belief masses.

Information about the speed of particles, as in the case of the exemplary particle 404, and the speed of cells, as in the case of the exemplary particle 410, in combination with their current position allow to track the movement of the object by making a prediction of the position of the particles in the future creating a hypothesis of which cells will be occupied by the object at a later time.

Since particles provide information about the environment around the vehicle, and predictions on how the environment evolves, increases in the number of particles on a map results in increases of the resolution of the map. On the other hand, each particle requires some computation to track its speed, project its position and in turn to compute the speed of objects in the environment relative to the vehicle. Increases in the number of particles inevitably results in increases in the computation and in turn in slower perception. It is therefore crucial to identify redundant particles that bring relatively little information and remove them. The objective of removing particles should be to reduce the number of particles in the grid without affecting the resolution of the map.

Object tracking provides an option to remove the redundant particles from an occupancy grid, and therefore improve the perception of AD systems. Objects are associated to an existence probability which represents the probability that the object occupies a given position in the occupancy grid. The bigger the probability of existence of the object in a given position, the smaller the number of particles that are required to track that object because the object as a whole can be tracked instead of tracking the single particles.

Figure 5B:
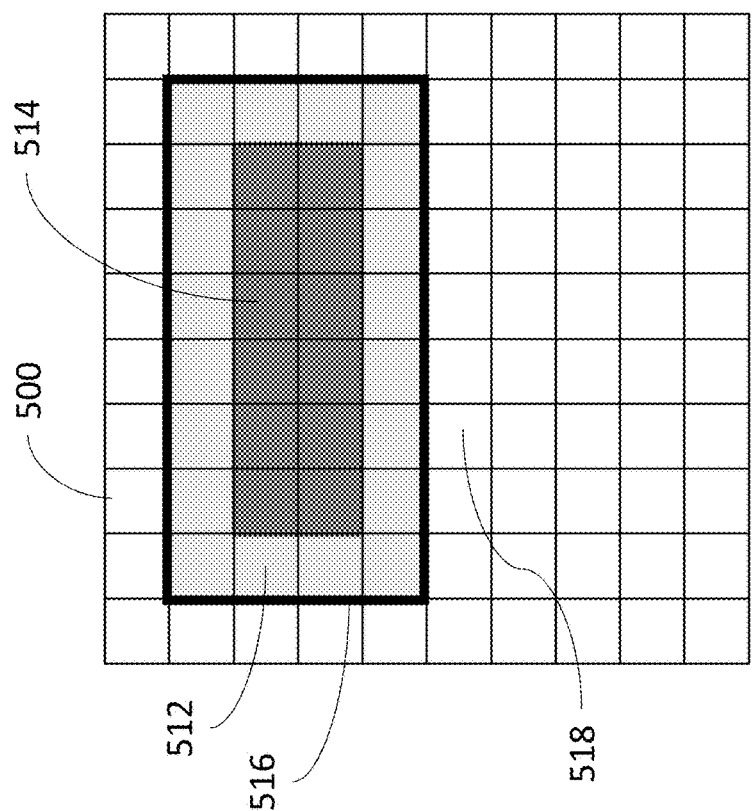
FIG. 5A and FIG. 5B show an example of object tracking on the occupancy grid.
Figure 5A:
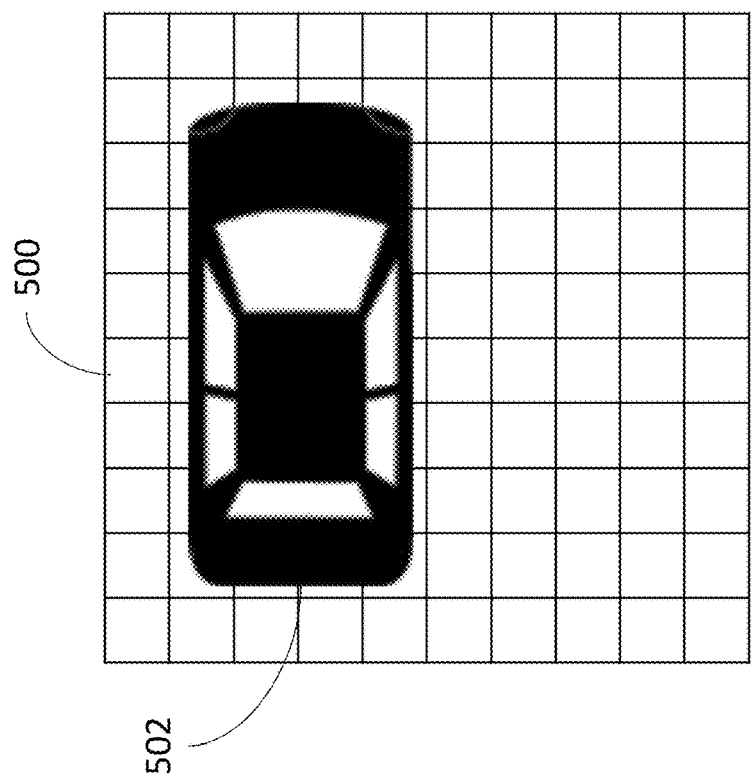

FIG. 5.a and FIG. 5.b show an example of object tracking on the occupancy grid 500.

FIG. 5.a shows an object, specifically a vehicle, 502 overlaid on the occupancy grid 500.

FIG. 5.b shows an example of how the vehicle 502 could be represented on the grid 500 by the object tracking device. The rectangle 512 in light grey colour, represents the outer grid cells of the object which at least includes the grid cells at the perimeter of object 502.

The outer grid cells of the object may correspond to the cells with higher uncertainty of the presence of the object 502.

In FIG. 5.b, shows an exemplary darker box 514 representing inner grid cells with lower uncertainty of the presence of the object 502.

The rectangle 516 illustratively represents the borders of the identified vehicle 502. More precisely the rectangle 516 represents a hypothesis of where the object is, how big it is, and in turn information about its velocity and its acceleration.

The cells outside the boundaries of the object, such as cell 518, are expected to be free signalling the fact that the object is not there.

Since the object 502 has been detected, and the rectangle 516 has been constructed, the object 502 can be tracked as a unit. Therefore, the particles that occupy the cells in the darker area 514 are redundant and therefore they can be removed, thereby reducing the number of particles that need to be tracked. In some examples, all particles in the darker area 514 are removed, in other examples the number of particles removed may be proportional to or dependent on the probability that the object occupies the cell in which the particles are. In other examples, the darker area may be thought as a single particle.

Particles in the object outer grid cells may not be removed. Furthermore, particles in the cells at the perimeter of the object cannot be removed.

Figure 6B:
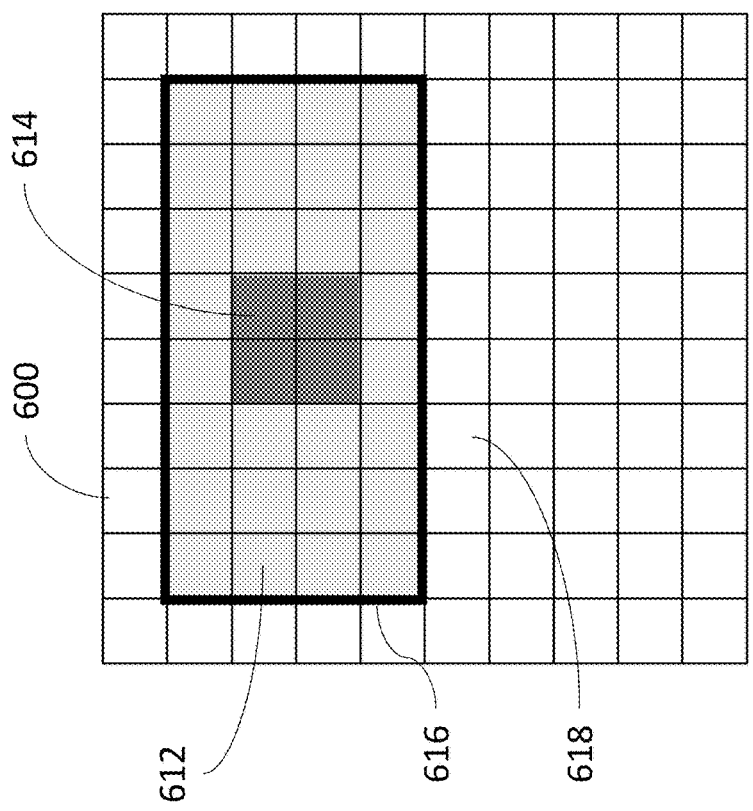
FIG. 6A and FIG. 6B show an exemplary perception of an obstacle or of a vehicle under two different likelihood conditions.
Figure 6A:
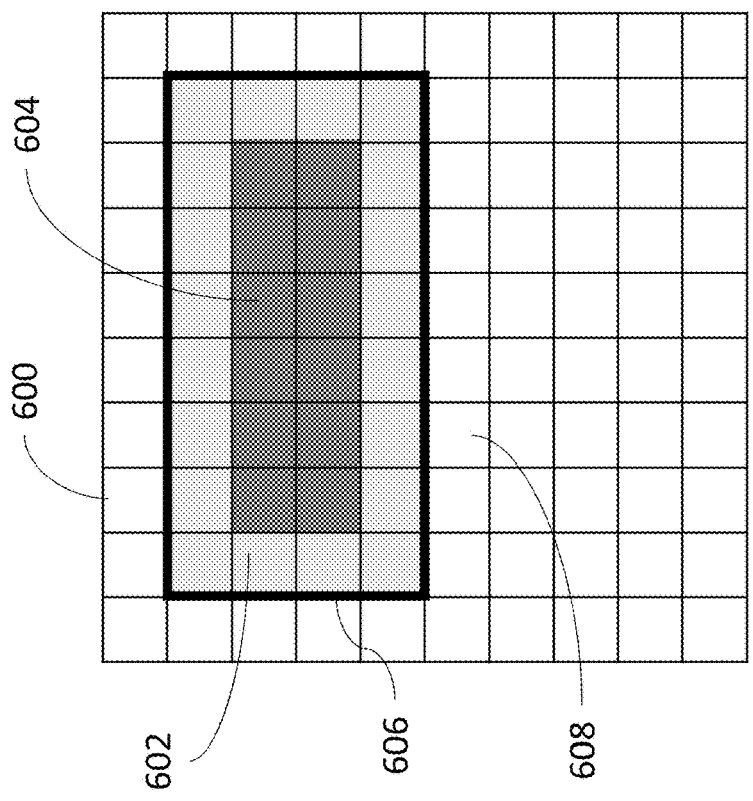

FIG. 6.a and FIG. 6.b show different exemplary perceptions of an obstacle or of a vehicle under two different likelihood conditions. The diagram in FIG. 6.a has the same structure of the diagram in FIG. 5.b: 602 represents the outer grid cells of the object 502; 604 represents the inner grid cells of the object 502; the rectangle 606 represents the border of the object; 608 represent an exemplary empty cell just outside the object 502.

Similarly, diagram in FIG. 6.b has the same structure of the diagram in FIG. 5.b: 612 the outer grid cells of the object 502; 614 represents the inner grid cells of the object 502, the rectangle 616 represents the border of the object, and 618 represents an exemplary empty cell just outside the object 502.

The difference between FIG. 6.a and FIG. 6.b is that the likelihood of having detected the object is different in the two cases. In the case of FIG. 6.a there is a high likelihood that the object has been detected, in the case of FIG. 6.b the likelihood is much smaller. This difference is illustratively shown by difference in size between rectangle 604 and rectangle 614. Specifically, rectangle 604 is bigger than rectangle 614 illustrating a higher certainty of the position of the perceived object or vehicle.

In the examples reported in FIG. 6.a and FIG. 6.b since rectangle 604 has a bigger size than the rectangle 614, more particles can be removed from occupancy grid in FIG. 6.a then from the occupancy grid in FIG. 6.b.

Sources of different likelihood conditions may depend on different factors including drastic, non-linear, changes of speed. For example, FIG. 6.a may correspond to a situation in which object 502 has a constant perceived speed, while FIG. 6.b may correspond to a situation in which object 502 has a perceived speed that changes due to sudden acceleration or sudden braking adding inevitable uncertainty to its position.

In the exemplary diagrams as shown in FIG. 5.a, FIG. 5.b, FIG. 6.a and FIG. 6.b the perceived object is represented as a rectangle that is aligned with the cells in the occupancy grid; but in other examples the perceived object may be a rectangle that may be at an angle in the plane represented by the occupancy grid. This is the case when the object turns or changes directions.

Furthermore, whereas illustratively diagrams in FIG. 5.a, FIG. 5.b, FIG. 6.a and FIG. 6.b have represented the exemplary object 502 as rectangles, in general the shape of the objects may be arbitrary. For example, static objects such as obstacles on the road are likely to be of any arbitrary shape.

For explanation purposes, in the exemplary diagrams in FIG. 5.a, FIG. 5.b, FIG. 6.a and FIG. 6.b the object 502 has been represented of the same size, but this is not necessarily the case. In different conditions the exemplary object 502 or any other object may appear longer or shorter, wider or thinner depending on the acceleration with respect to the object tracking device. For examples, faster objects, who tend to be associated to a higher uncertainty, may tend to appear longer with a smaller likelihood of detection. These objects may tend to appear more similar to the object in 6.b than in 6.a. In turn they tend to require an increasing number of particles.

In all these cases, the dimensions of the outer rectangle 516, or equivalently 606 and 616, representing the borders of the object in the grid should not be smaller than the real object 502.

The detection of objects is based on the construction of object hypotheses on where the object may be and what its features may be including dimensions, velocity, acceleration, angle with respect to the grid and direction changes.

Objects hypotheses are formed starting from the occupancy of cells. Occupied cells are clustered together to form objects; the limit of the objects are the open spaces around the objects. The clustered cells give information about object position and dimensions.

All occupied cells in the grid should be associated with an object hypothesis. Occupied cells that are not associated to the existing object hypotheses are considered to be missed objects until a new hypothesis that includes them is generated. In other words, a new object hypothesis may be created from occupied cells that are not associated to the existing object hypotheses, and they may later be tracked as any other object in the grid. Object hypothesis can be exemplarily described by the following parameters:

$$s=(x,y,v,\varphi,a,\bar{\omega},l,w), \quad (2)$$

Where:
x, y are coordinates of the perceived object in the occupancy grid;
v is the estimated velocity of the perceived object;
$\varphi$, is the angle of the perceived object with respect to the occupancy grid coordinate system;
a, $\bar{\omega}$ are the acceleration and angular velocity of the perceived object;
l, w are the object dimensions length and width of the perceived object.

In some examples, the parameters x, y, v, $\varphi$, a, $\bar{\omega}$, l, w are measured in terms of units of cells. For example, object 502 as represented in FIG. 5.*b* would be in position x=2 and y=2, also it would be eight cells long and four cells wide, in other words l=8 and w=4. This would function similarly for the other parameters.

An computation of the hypothesized object parameters x, y, v, $\varphi$, a, $\bar{\omega}$, l, w may be based on a mathematical function, such as for example a summary statistics like the mean, based on the particles that are in the cells covered by the hypothesized object.

In some examples, the hypothesized object parameters x, y, v, $\varphi$, a, $\bar{\omega}$, l, w may be computed using an Unscented Kalman Filter (UKF) with a measurement vector of the form:

$$z=(x,y,v,\varphi,l,w), \quad (3)$$

Where:
x, y are coordinates of the perceived object in the occupancy grid;
v is the estimated velocity of the perceived object;
$\varphi$, is the object angle of the perceived object;
l, w are the object dimensions length and width of the perceived object.

The parameters x, y, v, $\varphi$, l, w of equation (3) may be measured in terms of units of cells.

The parameters x, y, v, $\varphi$, l, w of the measurement vector of the Unscented Kalman Filter in equation (3) may be derived through a calculation of a mathematical function, such as for example a summary statistic like the mean, based on the information provided by particles that are in the cells covered by the hypothesized object.

An exemplary method to associate cells to an object is (please note that this may be performed for each cell; for reasons of simplicity, however, a respective cell index has been omitted in the formula):

$$\alpha = k_{oc} \cdot e^{-\frac{d_x^2}{2\sigma_{x,l}^2}} + k_{free} \cdot bF \cdot e^{-\frac{(d_x \pm 0.5l)^2}{2\sigma_{xF}^2}} + k_{occ} \cdot bO \cdot e^{-\frac{(d_x \pm 0.5l)^2}{2\sigma_{xOcc}^2}} \quad (4)$$

Where:
bF is the sum of cell free space beliefs in the free space area. It is normalized with the area size. Formally:

$$bF = \sum_{free\ space\ area} m(\{F\})/\text{normilized with area size}$$

bO is the sum of cell occupancy beliefs in the free space area. It is normalized with the area size.

$$bO = \sum_{occupancy\ area} m(\{S\}, \{D\})/\text{normilized with area size}$$

$k_{oc}$, $k_{free}$, $k_{occ}$ are constants for object dimension, for free space and for occupancy parts.
$d_x$ is the cell position from the object center in x direction.
l is object length.
$\sigma_{x,l}^2$ is the variance of the position and dimensions of the object.
$\sigma_{x,F}^2$ is the variance of the distribution of free cells in the grid.
$\sigma_{x,I}^2$ is the variance of the distribution of occupied cells (static and dynamic cells) in the grid.

An exemplary method for propagating dynamic particles to the next time frame t may be based on the formula:

$$x_{t,[k]}=x_{t-1,[k]}+\Delta t v_{t-1,[k]}+N(0,\text{diag}(\sigma_{nx}^2,\sigma_{ny}^2)). \quad (5)$$

Where:
$x_{t,[k]}$ represents the position of particle k in the next time frame t.
$x_{t-1,[k]}$ represents the position of particle k in the current time frame t−1.
$v_{t-1,[k]}$ represents the velocity of particle k in the current time frame t−1.
$\Delta t$ represents the elapsed time.
$\sigma_{nx}^2$ and $\sigma_{ny}^2$ are the standard deviations of the radial velocities.

An exemplary method for computing the following expected speed in the next time frame t may be based on the formula:

$$v_{t,[k]}=v_{t-1,[k]}+N(0,\text{diag}(\sigma_{nv}^2,\sigma_{nv}^2)). \quad (6)$$

Where:
$v_{t,[k]}$ represents the velocity of particle k in the next time frame t.
$v_{t-1,[k]}$ represents the velocity of particle k in the current time frame t−1.
$\Delta t$ represents the elapsed time from t−1 and t.
$\sigma_{nx}^2$ and $\sigma_{ny}^2$ are the standard deviations of the radial velocities.

In some cases, particles propagated using formulae (5) and (6) may be placed in the cells inside hypothesized objects that are associated with high likelihood of object occupancy; these particles may be removed from the occupancy grid.

Figure 7:
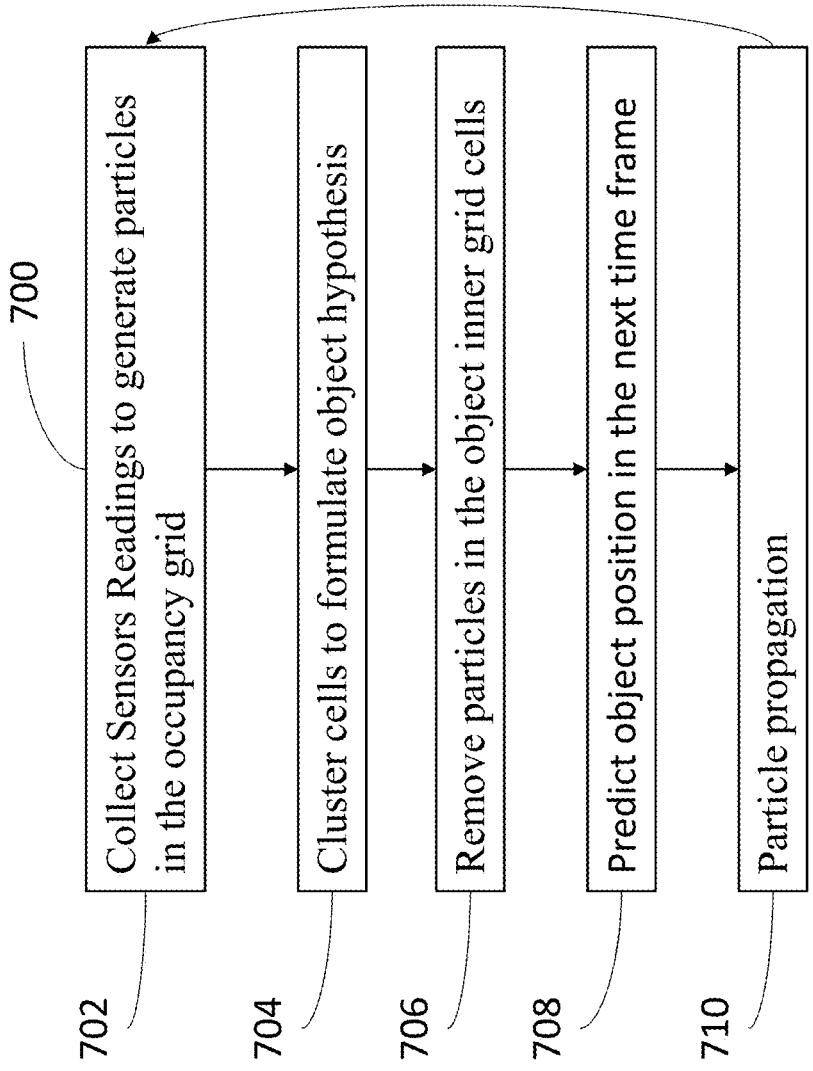
FIG. 7 shows a flow diagram to update the occupancy grid taking into account object tracking and particles removal.

Particles that were related to tracked objects but that due to a propagation computation performed following (5) and (6) move to the region outside of the tracked object area and will be resampled with the weight proportional to the tracked object existence probability. In turn this resampling attempts to verify whether the object occupies also the cell in which FIG. 7 shows a flow diagram 700 to update the occupancy grid taking into account object tracking and particles removal.

In 702 sensor readings are collected to identify particles to add to the occupancy grid. The occupancy grid generated may be associated with belief masses about cell occupation consistent with equation (1).

In 704 cells are clustered together to formulate object hypothesis. The resulting cells object association may follow equation (4). This step may result in a model of objects consistently with equation (2).

In 706 the particles associated to object inner grid cells with lower uncertainty of the presence of the object are removed.

In 708 the object position in the next time frame is predicted. The prediction of the object position to the next time frame may be performed with the Unscented Kalman Filter using the measurement vector in (3).

In 710 the particles in the grid are propagated consistently with the occupancy grids propagation algorithms as described by the equations (5) and (6).

Since the particle removing step 706 removes particles from the occupancy grid, the particles required to perform steps 708 and 710 are less than the particles originally generated in step 702, therefore the computation required to complete the perception process is reduced.

In the following, various examples are provided with reference to the aspects described above.

Example 1 is a method of determining at least one object in an occupancy grid, where the method may include the generation of an occupancy grid of a predetermined region, where the occupancy grid includes of a plurality of grid cells and at least some of the grid cells have been assigned an information about the occupancy of the region represented by the respective grid cell; determining at least one object in the occupancy grid wherein the at least one object includes a plurality of grid cells; and removing occupancy information from at least one grid cell of the plurality of grid cells of the determined object.

In Example 2, the subject matter of Example 1 may optionally include that each grid cell of the at least one object is assigned a probability of presence of the at least one object in the area represented by the grid cell.

In Example 3, the subject matter of Example 2 may optionally include that the number of particles that are assigned to a respective grid cell is dependent on the probability assigned to the respective grid cell.

In Example 4, the subject matter of any one of Examples 1 to 3 may optionally include that at least some of the grid cells are associated with a respective velocity value.

In Example 5, the subject matter of any one of Examples 1 to 4 may optionally include that at least one object includes at least one of a static grid cell, which is occupied by particles and have velocity of zero, or a dynamic grid cell, which is occupied by particles and has a velocity greater than zero.ells are associated with a respective velocity value.

In Example 6, the subject matter of any one of Examples 1 to 5 may optionally include that the method is performed repeatedly; and at least one object in the occupancy grid is tracked in the iterations using a filter process.

In Example 7, the subject matter of Example 6 may optionally include that the filter process is a Kalman filter process, or a type of Kalman filter process such as the unscented Kalman filter, taking into account a number of particles that is smaller than the number of grid cells contained in the at least one object.

In Example 8, the subject matter of anyone of Examples 6 or 7 may optionally include that the filter process determines new particles for at least some of the grid cells of the at least one object along its moving path or along the predicted moving path.

In Example 9, the subject matter of any one of Examples 1 to 8 may optionally include a method for determining the particles of the grid cells of a respective object which includes the outer grid cells and the inner grid cells, such that at least some inner grid cells are assigned a smaller number of particles than the outer grid cells.

In Example 10, the subject matter of Example 9 may optionally include that at least one of the inner grid cells is free of particles.

In Example 11, the subject matter of any one of Examples 9 or 10 may optionally include that all outer grid cells have assigned particles.

Example 12 is device of determining at least one object in an occupancy grid, the device where the device may include a grid generator configured to generate an occupancy grid of a predetermined region, the occupancy grid including a plurality of grid cells and at least some of the grid cells having been assigned an information about the occupancy of the region represented by the respective grid cell; a determiner configured to determine at least one object in the occupancy grid wherein the at least one object includes a plurality of grid cells; and a remover configured to remove occupancy information from at least one grid cell of the plurality of grid cells of the determined object.

In Example 13, the subject matter of Example 12 may optionally include that the grid generator is further configured to assign to each grid cell of the at least one object a probability of presence of the at least one object in the area represented by the grid cell.

In Example 14, the subject matter of Example 13 may optionally include that the grid generator is further configured to determine the number of particles that are assigned to a respective grid cell dependent on the probability assigned to the respective grid.

In Example 15, the subject matter of any one of Examples 12 to 14 may optionally include that the grid generator is further configured to determine at least some of the grid cells associated with a respective velocity value.

In Example 16, the subject matter of any one of Examples 12 to 15 may optionally include that at least one object includes at least one of a static grid cell, which is occupied by particles and has a velocity of zero, or a dynamic grid cell, which is occupied by particles and has a velocity greater than zero.

In Example 17, the subject matter of any one of Examples 12 to 16 may optionally include that the device is configured to perform the determination repeatedly; and that the device further includes an object tracker configured to track the at least one object in the occupancy grid in the iterations using a filter process.

In Example 18, the subject matter of Example 17 may optionally include that the device may optionally include that the object tracker is configured to implement a Kalman filter process as the filter process, or a type of Kalman filter process such as the unscented Kalman filter, taking into account a number of particles that is smaller than the number of grid cells contained in the at least one object.

In Example 19, the subject matter of any one of Examples 17 or 18 may optionally include that the object tracker is configured to implement the filter process to determine new particles for at least some of the grid cells of the at least one object along its moving path.

In Example 20, the subject matter of any one of Examples 12 to 19 may optionally include that the grid generator is further configured to determine the particles of the grid cells of a respective object which includes outer grid cells and inner grid cells such that at least some inner grid cells are assigned a smaller number of particles than the outer grid cells.

In Example 21, the subject matter of Example 20 may optionally include that the grid generator is further configured to generate at least one of the inner grid cells to be free of particles.

In Example 22, the subject matter of any one of Examples 20 or 21 may optionally include that the grid generator is further configured to generate all outer grid cells having assigned particles.

Example 23 is a method of of processing at least one object in an occupancy grid, where the method may include generating an occupancy grid of a predetermined region, the occupancy grid including a plurality of grid cells and at least some of the grid cells having been assigned an information about the occupancy of the region represented by the respective grid cell; determining at least one object in the occupancy grid wherein the at least one object includes a plurality of grid cells; and determining a movement of the at least one object, wherein the movement is determined as a common movement for a plurality of grid cells of the at least one object.

In Example 24, the subject matter of Example 23 may optionally include that each grid cell of the at least one object is assigned a probability of presence of the at least one object in the area represented by the grid cell.

In Example 25, the subject matter of Example 24 may optionally include that a number of particles that are assigned to a respective grid cell and which represents the information about the occupancy of the region is dependent on the probability assigned to the respective grid.

In Example 26, the subject matter of any one of Examples 23 to 25 may optionally include that at least some of the grid cells are associated with a respective velocity value.

In Example 27, the subject matter of any one of Examples 23 to 26 may optionally include that at least one object includes at least one of a static grid cell, which is occupied by particles and has a velocity of zero, or a dynamic grid cell, which is occupied by particles and has a velocity greater than zero.

In Example 28, the subject matter of any one of Examples 23 to 27 may optionally include that the movement of the at least one object in the occupancy grid is determined using a filter process.

In Example 29, the subject matter of Example 28 may optionally include that the filter process is a Kalman filter process, or a type of Kalman filter process such as the unscented Kalman filter, taking into account a number of particles that is smaller than the number of grid cells contained in the at least one.

In Example 30, the subject matter of any one of Examples 28 or 29 may optionally include that the filter process determines new particles for at least some of the grid cells of the at least one object along its moving path.

In Example 31, the subject matter of any one of Examples 23 to 30 may optionally include determining the particles of the grid cells of a respective object which includes outer grid cells and inner grid cells such that at least some inner grid cells are assigned a smaller number of particles than the outer grid cells.

In Example 32, the subject matter of Example 31 may optionally include that at least one of the inner grid cells is free of particles.

In Example 33, the subject matter of any one of Examples 31 or 32 may optionally include that all outer grid cells have assigned particles.

Example 34 is a device of processing at least one object in an occupancy grid, the device may include a grid generator configured to generate an occupancy grid of a predetermined region, the occupancy grid including a plurality of grid cells and at least some of the grid cells having been assigned an information about the occupancy of the region represented by the respective grid cell; an object determiner configured to determine at least one object in the occupancy grid wherein the at least one object includes a plurality of grid cells; and a movement determiner configured to determine a movement of the at least one object, wherein the movement is determined as a common movement for a plurality of grid cells of the at least one object.

In Example 35, the subject matter of Example 34 may optionally include that the grid generator is configured to assign to each grid cell of the probability of presence of the at least one object in the area represented by the grid cell.

In Example 36, the subject matter of Example 35 may optionally include that the grid generator is configured to assign a number of particles to a respective grid cell and which represents the information about the occupancy of the region dependent on the probability assigned to the respective grid.

In Example 37, the subject matter of any one of Examples 34 to 36 may optionally include that the grid generator is configured to associate at least some of the grid cells with a respective velocity value.

In Example 38, the subject matter of any one of Examples 34 to 37 may optionally include that the at least one object includes at least one of a static grid cell, which is occupied by particles and has a velocity of zero, or a dynamic grid cell, which is occupied by particles and has a velocity greater than zero.

In Example 39, the subject matter of any one of Examples 34 to 38 may optionally include that the movement determiner is configured to determine the movement of the at least one object in the occupancy grid using a filter process.

In Example 40, the subject matter of Example 39 may optionally include that the movement determiner is configured to implement the filter process as a Kalman filter process taking into account a number of particles that is smaller than the number of grid cells contained in the at least one object.

In Example 41, the subject matter of any one of Examples 39 or 40 may optionally include that the movement determiner is configured to implement the filter process to determine new particles for at least some of the grid cells of at least one object along its moving path.

In Example 42, the subject matter of any one of Examples 34 to 41 may optionally include that the grid generator is configured to determine the particles of the grid cells of a respective object which includes outer grid cells and inner grid cells such that at least some inner grid cells are assigned a smaller number of particles than the outer grid cells.

In Example 43, the subject matter of Example 42 may optionally include that the grid generator is configured to generate at least one of the inner grid cells free of particles.

In Example 44, the subject matter of any one of Examples 42 or 43 may optionally include that the grid generator is configured to generate all outer grid cells having assigned particles.

In Example 45 the subject matter of Example 3 may be based on a summary statistics of the probability of the presence of the particles in the cell.

In Example 46 the subject matter of Example 4 may be based on a summary statistics if the velocity of the particles in the cell.

In Example 47 the subject matter of Example 8 may optionally include that the filter process determines new particles for at least some of the grid cells of the at least one object along its predicted moving path.

What is claimed is:

1. An occupancy grid object determining device, comprising
    a grid generator configured to generate an occupancy grid of a predetermined region, the occupancy grid comprising a plurality of grid cells and at least some of the grid cells having been assigned an information about the occupancy of the region represented by the respective grid cell;
    a determiner configured to determine at least one object in the occupancy grid wherein the at least one object comprises a plurality of grid cells; and
    a remover configured to remove occupancy information from at least one grid cell of the plurality of grid cells of the determined object;
    wherein the grid generator is further configured to assign to each grid cell of the at least one object a probability of presence of the at least one object in the area represented by the grid cell.

2. The occupancy grid object determining device of claim 1,
    wherein the grid generator is further configured to determine number of particles that are assigned to a respective grid cell dependent on the probability assigned to the respective grid.

3. The occupancy grid object determining device of claim 1,
    wherein the grid generator is further configured to determine at least some of the grid cells associated with a respective velocity value.

4. The occupancy grid object determining device of claim 1,
    wherein the at least one object comprises at least one of a static grid cell, which is occupied by particles and has a velocity of zero, or a dynamic grid cell, which is occupied by particles and has a velocity greater than zero.

5. The occupancy grid object determining device of claim 1,
    wherein the device is configured to perform the determination repeatedly; and wherein the device further comprises an object tracker configured to track the at least one object in the occupancy grid in the iterations using a filter process.

6. The occupancy grid object determining device of claim 5,
    wherein the object tracker is configured to implement a Kalman filter process as the filter process taking into account a number of particles that is smaller than the number of grid cells contained in the at least one object.

7. The occupancy grid object determining device of claim 5,
    wherein the object tracker is configured to implement the filter process to determine new particles for at least some of the grid cells of the at least one object along its moving path.

8. The occupancy grid object determining device of claim 1,
    wherein the grid generator is further configured to determine the particles of the grid cells of a respective object which comprises outer grid cells and inner grid cells such that at least some inner grid cells are assigned a smaller number of particles than the outer grid cells.

9. The occupancy grid object determining device of claim 8,
    wherein the grid generator is further configured to generate at least one of the inner grid cells to be free of particles.

10. The occupancy grid object determining device of claim 8,
    wherein the grid generator is further configured to generate all outer grid cells having assigned particles.

11. An occupancy grid object processing device, comprising
    a grid generator configured to generate an occupancy grid of a predetermined region, the occupancy grid comprising a plurality of grid cells and at least some of the grid cells having been assigned an information about the occupancy of the region represented by the respective grid cell;
    an object determiner configured to determine at least one object in the occupancy grid wherein the at least one object comprises a plurality of grid cells; and
    a movement determiner configured to determine a movement of the at least one object, wherein the movement is determined as a common movement for a plurality of grid cells of the at least one object;
    wherein the grid generator is configured to assign to each grid cell of the at least one object a probability of presence of the at least one object in the area represented by the grid cell.

12. The occupancy grid object processing device of claim 11,
    wherein the grid generator is configured to assign a number of particles to a respective grid cell and which represents the information about the occupancy of the region dependent on the probability assigned to the respective grid.

13. The occupancy grid object processing device of claim 11,
    wherein the grid generator is configured to associate at least some of the grid cells with a respective velocity value.

14. The occupancy grid object processing device of claim 11,
    wherein the at least one object comprises at least one of a static grid cell, which is occupied by particles and has a velocity of zero, or a dynamic grid cell, which is occupied by particles and has a velocity greater than zero.

15. The occupancy grid object processing device of claim 11,
    wherein the movement determiner is configured to determine the movement of the at least one object in the occupancy grid using a filter process.

16. The occupancy grid object processing device of claim 15,
    wherein the movement determiner is configured to implement the filter process as a Kalman filter process taking into account a number of particles that is smaller than the number of grid cells contained in the at least one object.

17. The occupancy grid object processing device of claim 15, wherein the movement determiner is configured to implement the filter process to determine new particles for at least some of the grid cells of the at least one object along its moving path.

18. The occupancy grid object processing device of claim 11,
wherein the grid generator is configured to determine the particles of the grid cells of a respective object which comprises outer grid cells and inner grid cells such that at least some inner grid cells are assigned a smaller number of particles than the outer grid cells.

* * * * *